US012236808B2

(12) United States Patent
Beatson et al.

(10) Patent No.: US 12,236,808 B2
(45) Date of Patent: Feb. 25, 2025

(54) CABLE LABEL

(71) Applicant: Novare Global Limited, Blenheim (NZ)

(72) Inventors: Charles Roy Beatson, Blenheim (NZ); Marcus Comaschi, Blenheim (NZ)

(73) Assignee: Novare Global Limited (NZ)

(*) Notice: Subject to any disclaimer, the term of this patent is extended or adjusted under 35 U.S.C. 154(b) by 195 days.

(21) Appl. No.: 18/143,961

(22) Filed: May 5, 2023

(65) Prior Publication Data

US 2024/0371298 A1 Nov. 7, 2024

(51) Int. Cl.
*G09F 3/16* (2006.01)
*G09F 3/02* (2006.01)

(52) U.S. Cl.
CPC . *G09F 3/16* (2013.01); *G09F 3/02* (2013.01)

(58) Field of Classification Search
CPC . G09F 3/16; G09F 3/02; G09F 3/0295; G09F 3/205; Y10T 24/39; Y10T 24/3969; Y10T 24/3996; Y10T 24/44573; Y10T 24/4459; Y10T 24/44607; Y10T 24/44615; Y10T 24/44624; Y10T 24/44632; Y10T 24/44966
USPC .......................... 40/316, 666, 658; 24/21, 25
See application file for complete search history.

(56) References Cited

U.S. PATENT DOCUMENTS 5,142,745 A * 9/1992 Setty ....................... F16G 11/02 24/115 M
2009/0229085 A1* 9/2009 Franklin ............. G09F 15/0025 24/115 M

FOREIGN PATENT DOCUMENTS

AU 2022201362 B1 * 5/2022 ............... G09F 3/02

* cited by examiner

*Primary Examiner* — Cassandra Davis
(74) *Attorney, Agent, or Firm* — Gloria Tsui-Yip; Gottlieb, Rackman & Reisman, P.C.

(57) ABSTRACT

A cable label 1 with a base 4 that has at least one channel 7. The label also has a clip 5 that has a central clamping arm 12 and at least one leg 6 that is ramped with respect to the clamping arm 12. The clip 5 can be fitted to the base 4 by positioning the leg 6 in the channel 7 and slid at least partially along the channel. When this is done the ramp of the leg causes the central clamping arm 12 to move progressively inwards to a clamping position and remain there under tension from the leg to secure the label to a cable 2.

13 Claims, 3 Drawing Sheets

CABLE LABEL

FIELD OF INVENTION

This invention relates to a cable label. Preferred forms of the invention relate to labels for attachment to cables that carry electrical power or electronic signals.

BACKGROUND

In the context of power, communications or other cables it is desirable to label them so that installers, service personnel and end users can readily identify what each cable is for. A problem with this is that some known labels have an insufficiently secure connection to the cable they are used with. A further problem is that many such labels are not readily reusable.

OBJECT

It is an object of preferred embodiments of the invention to address one or both of the above problems. While this applies to preferred embodiments, it should be understood that the object of the invention in its broadest form is simply to provide a useful choice. Therefore any object applicable to a preferred embodiment should not be inferred as a limitation on claims expressed without reference to it.

Definitions

The term “comprises” or “has”, if and when used in this document in relation to one or more features, should not be seen as excluding the option of there being additional unmentioned features. The same applies to derivative terms such as “comprising” and “having”.

SUMMARY OF THE INVENTION

According to one aspect, of the invention there is provided a cable label comprising:

a) a base that has at least one channel; and b) a clip that has a central clamp arm and at least one leg that is ramped with respect to the clamp arm;

the label being formed such that the clip can be fitted to the base by positioning the leg in the channel and slid at least partially along the channel such that the ramp of the leg causes the central clamp arm to move progressively inwards to a clamping position and remain there under tension from the leg.

Optionally— a) the base has at least two of the channels spaced from one another; and b) the clip has at least two of the legs and both are ramped with respect to the clamp arm;

the label being formed such that the clip can be fitted to the base by positioning each of the legs in a different one of the channels and slid at least partially along the channels such that the ramp of each leg causes the central clamp arm to move progressively inwards to a clamping position and remain there under tension from the legs.

Optionally a lead end of each leg has an angled foot which assists to prevent the legs from freely sliding along the channels, but is such that a positive hand force can be applied to the clip to cause sliding of the legs along the channels.

Optionally each of the channels comprises a turned over edge of the base.

Optionally there is a space between an inwardly facing side of each channel and a floor of the base, and each leg extends into and/or through a respect one of the spaces.

Optionally the central clamp arm has an inwardly (e.g. downwardly) angled distal end.

Optionally the distal end of the clamp arm is generally V-shaped.

Optionally the clip has a grip portion opposite the distal end of the clamp arm.

Optionally the clip’s legs are subject to inherent spring-back force if moved non-destructively with respect to the grip-portion.

Optionally the clamping arm is substantially parallel with the base.

Optionally the base has a planar face engraved with or otherwise bearing information in the form of words, numbers, imagery or a combination of any of these.

Optionally, the label is secured to a cable such that the cable extends between the legs, and the clamping arm presses against the cable under tension generated by the legs having been slid along the channels.

DRAWINGS

Some preferred forms of the invention will now be described by way of example and with reference to the accompanying images, of which:

DETAILED DESCRIPTION

Figure 1:
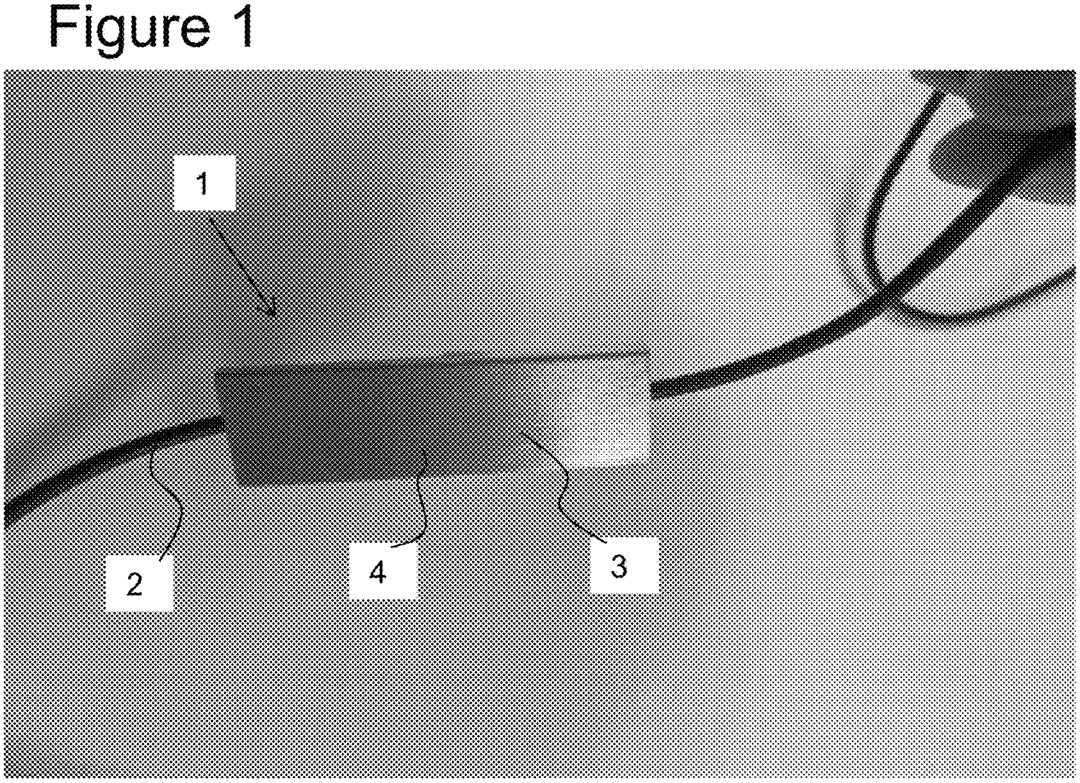
FIG. 1 is an isometric view of a cable label when in use with a cable.

Referring to FIG. 1, the cable label 1 is shown secured to a data cable 2. The label has a flat face 3 for carrying indicia and/or pictorial matter (not shown). These may be engraved or printed directly on the flat face 3, or may be part of a sticker applied to that face.

Figure 2:
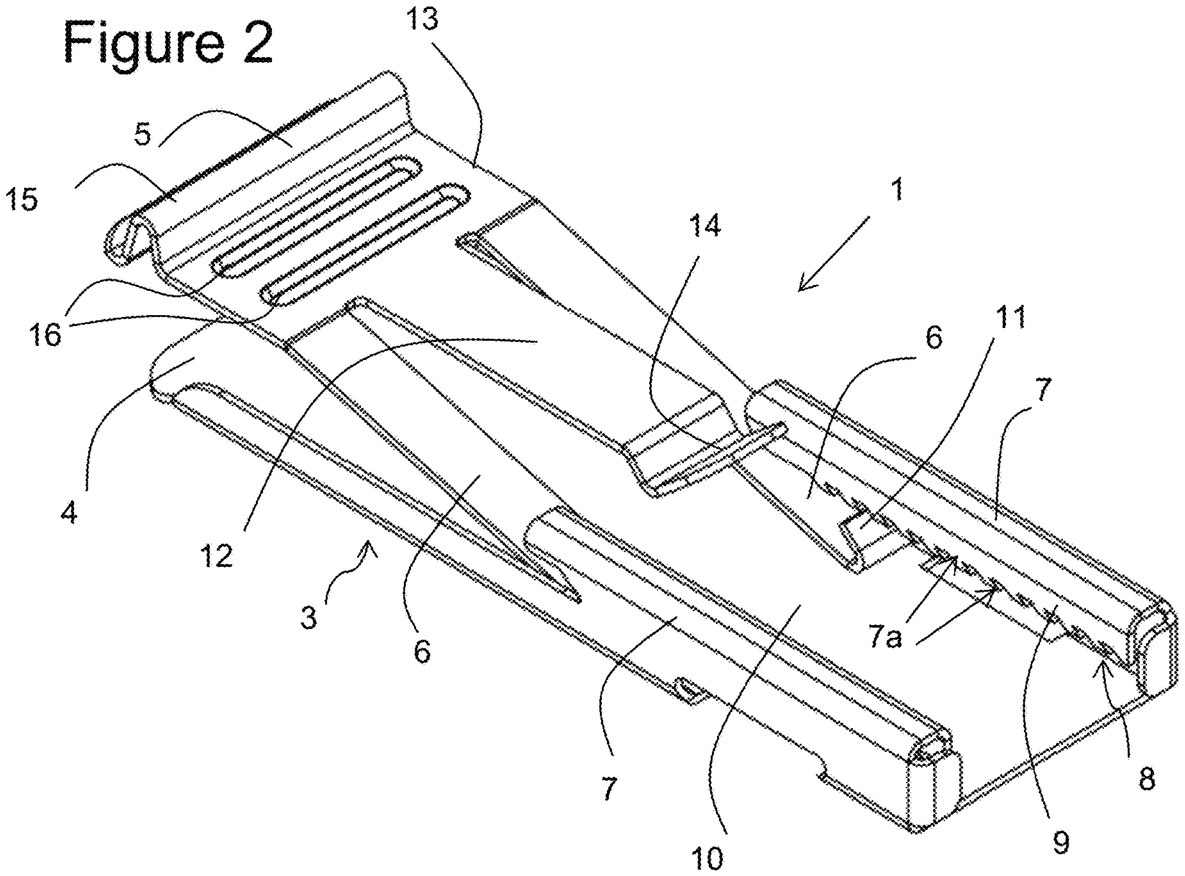
FIG. 2 is an isometric view of the label shown without the cable.

Referring to FIG. 2, the label 1 is preferably in two pieces, having a base 4 and a clip 5. The opposite face of the base 4 to that shown incorporates the flat face 3 mentioned above. The arrangement is such that the clip 5 has a pair of tensioning legs 6 that can be slid into engagement with a respective one of two channels 7 that form part of the base. Each channel 7 comprises a rolled-over side of the base 4, and is such that there is a space 8 between the inside facing wall 9 of the channel and the floor 10 of the base.

Still with FIG. 2, each leg 6 incorporates an upwardly angled foot 11, only one of which is shown in the drawing. As each leg 6 is slid along the corresponding channel 7, its foot 11 is in tension against the floor 10 of the base and also against the underside of the channel’s inwards facing wall. In a sense the foot scrapes along the channel as it slides. As illustrated, each leg 6, including its foot 11, is wider than the channel 7, but is able to be slid along the channel by deliberate-positive hand force. As the leg 6 is slid further along the channel, the clip 5 moves further forward, or more to the right from the perspective of FIG. 2.

Figure 3:
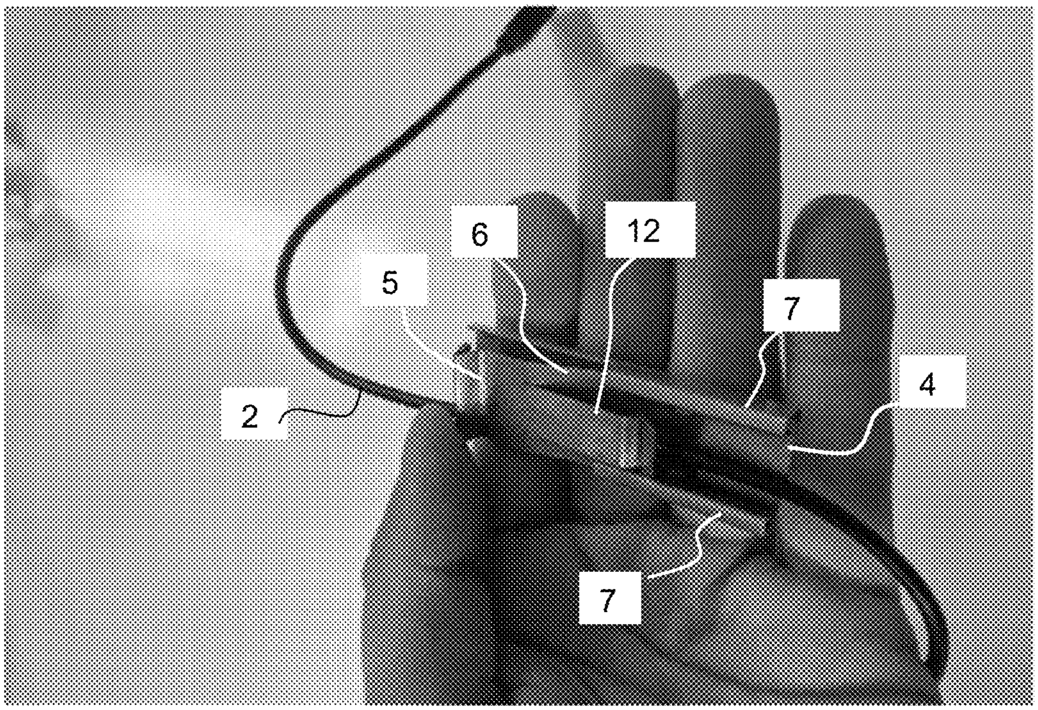
FIG. 3 is an alternative isometric view of the label when in use with the cable.
Figure 4:
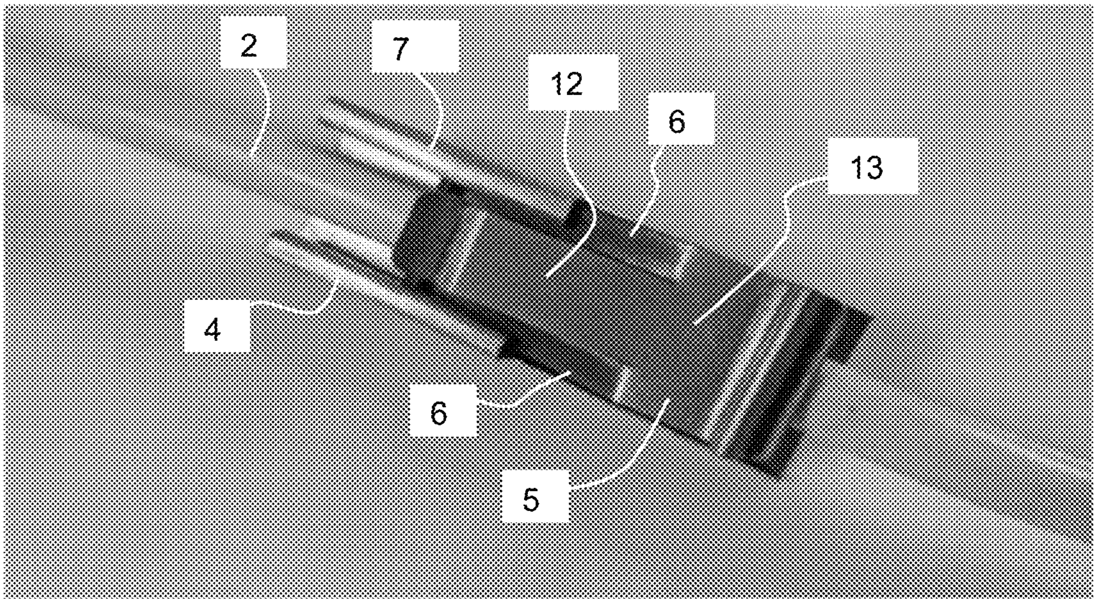
FIG. 4 is a further alternative isometric view of the label when in use with the cable.
Figure 5:
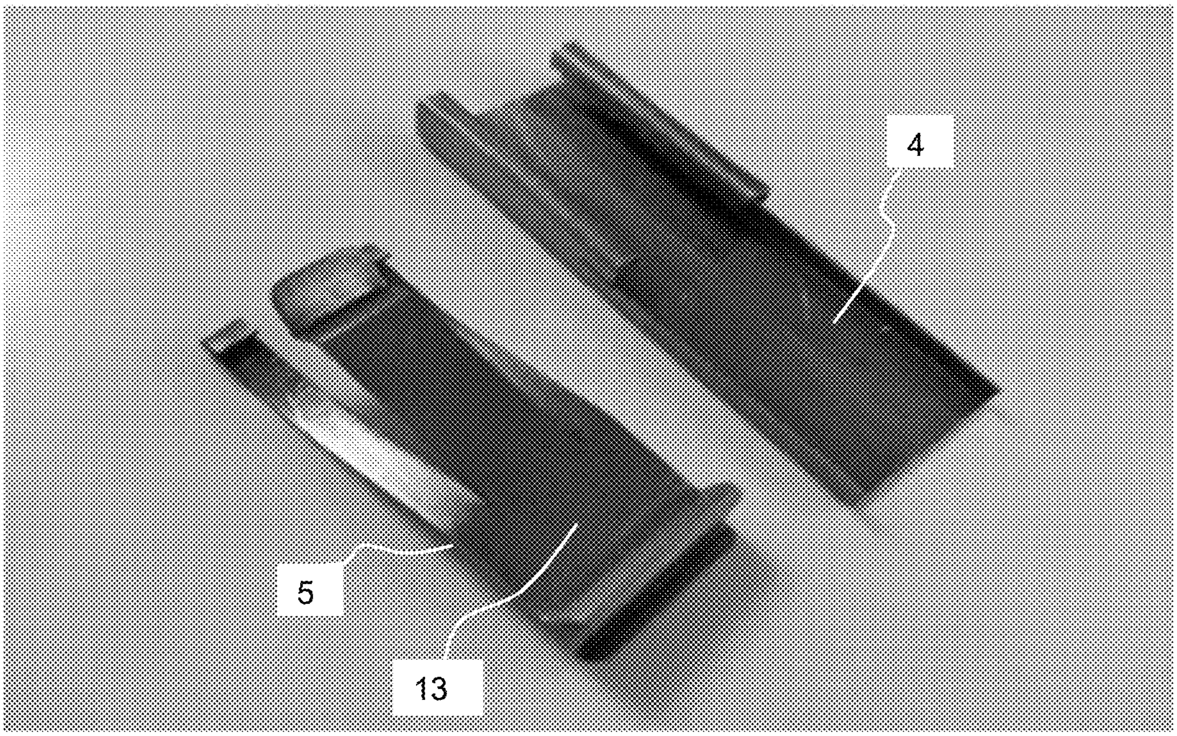
FIG. 5 is an isometric view of the label when disassembled.

Referring also to FIG. 3, the clip 5 comprises a clamping arm 12 and each leg 6 is ramped with respect to both the arm 12 and the base 4. The arrangement is such that as the clip 5 is slid forward along the channels 11, it is, overall, pulled inwards (i.e. downwards when in the FIG. 2 orientation). As indicated in FIG. 3 and FIG. 4, this inwards movement causes the clamping arm 12 to press against the cable 2 so that it is tightly gripped by the label. However, reverse movement of the clip 5 by deliberate positive hand force is possible, so that the clip is freed from the base as shown in FIG. 5. This enables the label to be altogether detached from the cable for re-use.

Referring back to FIG. 2, the clamping arm 12 extends from a hub 13 that also forms part of the clip 5. As shown, the hub 13 is plate-like and is parallel to the floor 10 of the base. The clamping arm 12 is also parallel to the floor 10, except for the distal end 14 which is inwardly angled (in this embodiment it has a V-shape). It is the distal end 14 that contacts the cable when it is engaged, so that the clamping force is more concentrated than if the entire arm 12 laid against the cable.

Referring again to FIG. 2, the platform 13 has a rear ridge 14 and a series of ribs 15. These provide finger or thumb grips for applying hand force to slide the clip forwards and back as desired.

The clip's legs 6 are resilient with respect to its platform 13. In other words, if the angle of the legs 6 changes with respect to the platform then they seek to spring-back, or are biased towards, their original position. This helps keep the legs 6 in a tensioned engagement with the channels 11 when the label is in use.

Preferably the cable label is formed from suitable metallic materials and/or suitable plastics.

It should be understood that while the above preferred embodiment has two of the legs 6 and two of the channels 7, in some other embodiments the clip may have only one, or more than two, of the legs 6 and the base may have only one, or more than two of, the channels 7. In each case the arrangement is such that the, or each, leg engages with the, or a respective one of, the channels and functions in the same way described above. In some further embodiments there may be more than one of the clamping arms each arranged to engage the cable, or more than one cable, when in use.

While some forms of the invention have been described by way of example, it should be appreciated that modifications and improvements can be made without departing from the scope of the following claims.

In terms of disclosure, this document envisages and hereby posits any feature mentioned herein in combination with any other feature or features mentioned herein, even if the combination is not claimed.

The invention claimed is:

1. A cable label comprising:

a) a base that has at least one channel; and b) a clip that has a central clamp arm and at least one leg having a ramp with respect to the clamp arm;

the label being formed such that the clip can be fitted to the base by positioning the at least one leg in the at least one channel and slid at least partially along the at least one channel such that the ramp of the at least one leg causes the central clamp arm to move progressively inwards to a clamping position and remain there under tension from the at least one leg.

2. A cable clamp according to claim 1, wherein:

a) the at least one channel comprises two channels, wherein the two channels are spaced from one another; and b) the at least one leg comprises two legs, wherein each of the two legs comprises a ramp with respect to the clamp arm;

the label being formed such that the clip can be fitted to the base by positioning each of the legs in a different one of the channels and slid at least partially along the channels such that the ramp of each leg causes the central clamp arm to move progressively inwards to a clamping position and remain there under tension from the legs.

3. A cable label according to claim 2, wherein a lead end of each leg has an angled foot which assists to prevent the legs from freely sliding along the channels, but is such that a positive hand force can be applied to the clip to cause sliding of the legs along the channels.

4. A cable label according to claim 3, wherein each of the channels comprises a turned over edge of the base.

5. A cable label according to claim 4, wherein there is a space between an inwardly facing side of each channel and a floor of the base, and each leg extends into and/or through a respect one of the spaces.

6. A cable label according to claim 5, wherein the central clamp arm has an inwardly angled distal end.

7. A cable label according to claim 6, wherein the distal end of the clamp arm is generally V-shaped.

8. A cable label according to claim 7, wherein the clip has a grip portion opposite the distal end of the clamp arm.

9. A cable label according to claim 8, wherein the legs are subject to inherent spring-back force if moved non-destructively with respect to the grip-portion.

10. A cable label according to claim 9, wherein the clamping arm is substantially parallel with the base.

11. A cable label according to claim 10, wherein the base has a planar face for engraving with or otherwise bearing information in the form of words, numbers, imagery or a combination of any of these.

12. A cable label according to claim 2, when secured to a cable such that the cable extends between the legs, and the clamping arm presses against the cable under tension generated by the legs having been slid along the channels.

13. A cable label according to claim 2, wherein:

a) a lead end of each leg has an angled foot which assists to prevent the legs from freely sliding along the channels but is such that a positive hand force can be applied to the clip to cause sliding of the legs along the channels;

b) each of the channels comprises a turned over edge of the base;

c) the central clamp arm has an inwardly angled distal end;

d) the clip has a grip portion opposite the distal end of the clamp arm;

e) the legs are subject to inherent spring-back force if moved non-destructively with respect to the grip-portion;

f) there is a space between an inwardly facing side of each channel and a floor of the base, and each leg extends into and/or through a respect one of the spaces; and g) the base is adapted to be engraved with or otherwise bears information in the form of words, numbers, imagery or a combination of any of these.

* * * * *